US009612354B2

(12) United States Patent
Partner et al.

(10) Patent No.: US 9,612,354 B2
(45) Date of Patent: Apr. 4, 2017

(54) GEOPHYSICAL SURVEY SYSTEM USING HYBRID AIRCRAFT

(71) Applicant: CGG SERVICES SA, Massy (FR)

(72) Inventors: Richard Partner, Kemptville (CA); Adam Smiarowski, Toronto (CA); Tom Payne, Ottawa (CA); Stuart Stevenson, Ottawa (CA); George Nader, Ottawa (CA); Philip Miles, Rockwood (CA)

(73) Assignee: CGG SERVICES SAS, Massy (FR)

( * ) Notice: Subject to any disclaimer, the term of this patent is extended or adjusted under 35 U.S.C. 154(b) by 119 days.

(21) Appl. No.: 14/615,718

(22) Filed: Feb. 6, 2015

(65) Prior Publication Data

US 2016/0161625 A1  Jun. 9, 2016

Related U.S. Application Data

(60) Provisional application No. 61/936,342, filed on Feb. 6, 2014, provisional application No. 62/092,937, filed on Dec. 17, 2014.

(51) Int. Cl.
*G01V 3/165* (2006.01)

(52) U.S. Cl.
CPC .................................. *G01V 3/165* (2013.01)

(58) Field of Classification Search
CPC combination set(s) only.
See application file for complete search history.

(56) References Cited

U.S. PATENT DOCUMENTS 5,119,028 A * 6/1992 Mooney ............... G01V 3/165
324/233

7,236,885 B2  6/2007 Macfarlane et al.
(Continued)

FOREIGN PATENT DOCUMENTS

KR          100974484 B1    8/2010
WO           03032015 A1    4/2003
(Continued)

OTHER PUBLICATIONS

J. P. Culle, Dept of Earth Science, Monash University, "Signal Processing Concepts for Airborne SIROTEM Data", Exploration Geophysics, vol. 22, No. 1, 1991, pp. 97-100.
(Continued)

*Primary Examiner* — Clayton E Laballe
*Assistant Examiner* — Jas Sanghera
(74) *Attorney, Agent, or Firm* — Patent Portfolio Builders PLLC

(57) ABSTRACT

There are systems and methods for performing a geophysical survey using a hybrid aircraft which includes an apparatus configured to perform the geophysical survey. The system including: three mutually orthogonal transmitters configured to transmit electromagnetic (EM) waveforms towards the ground which creates a secondary magnetic field, wherein the three mutually orthogonal transmitters are attached to the hybrid aircraft; three mutually orthogonal null-coupled receivers configured to obtain measurements associated with the secondary magnetic field, wherein the three mutually orthogonal null-coupled receivers are attached to the hybrid aircraft; and three mutually orthogonal gradient receivers configured to obtain measurements, wherein the three mutually orthogonal gradient receivers are attached to the hybrid aircraft.

19 Claims, 15 Drawing Sheets

(56) References Cited

U.S. PATENT DOCUMENTS

| | | |
|---|---|---|
| 7,646,201 B2 | 1/2010 | Miles et al. |
| 7,948,237 B2 | 5/2011 | Kuzmin et al. |
| 8,305,082 B2 | 11/2012 | Merchant et al. |
| 8,400,157 B2 | 3/2013 | Kuzmin et al. |
| 8,596,571 B2 | 12/2013 | Goelet |
| 2009/0284258 A1 | 11/2009 | Morrison et al. |
| 2010/0188089 A1 | 7/2010 | Kuzmin et al. |
| 2011/0198438 A1 | 8/2011 | Colting |
| 2012/0293177 A1* | 11/2012 | Dodds ............... G01V 3/17 324/331 |
| 2014/0012505 A1 | 1/2014 | Smith |
| 2014/0266213 A1* | 9/2014 | Olsson ............... G01V 3/17 324/329 |

FOREIGN PATENT DOCUMENTS

| | | |
|---|---|---|
| WO | 2012051676 A1 | 4/2012 |
| WO | 2013067624 A1 | 5/2013 |
| WO | 2013138908 A1 | 9/2013 |

OTHER PUBLICATIONS

J. P. Culle, Dept of Earth Science, Monash University, "Airborne Sirotem", Exploration Geophysics, vol. 20, 1989, pp. 399-402.

* cited by examiner

706

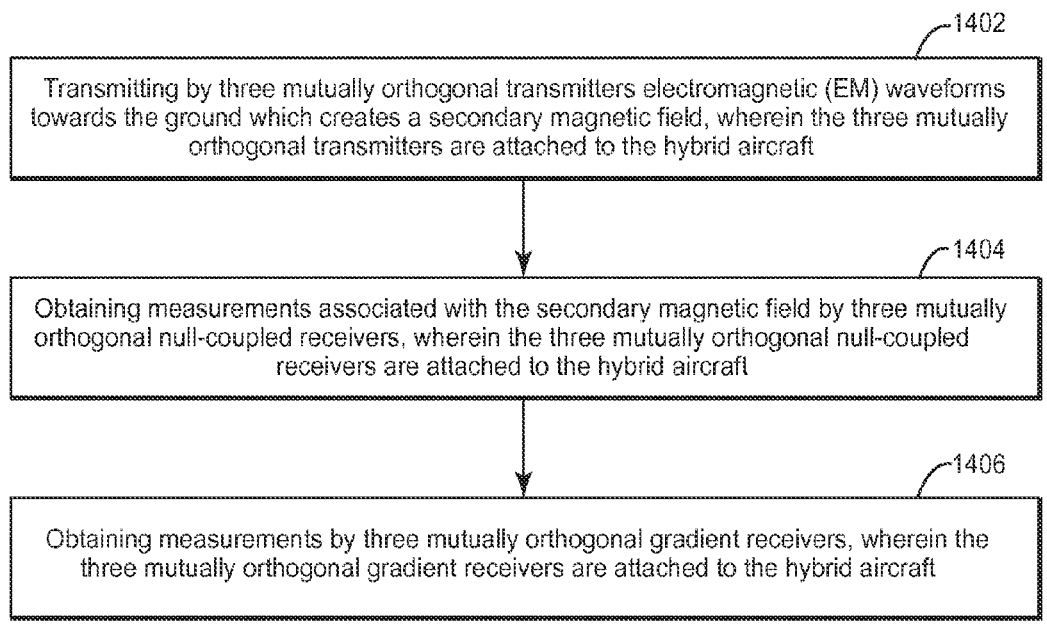

GEOPHYSICAL SURVEY SYSTEM USING HYBRID AIRCRAFT

RELATED APPLICATION

The present invention is related to, and claims priority from, the U.S. Provisional Patent Application Ser. No. 61/936,342, entitled "Geophysical Survey System Using Hybrid Aircraft", filed on Feb. 6, 2014 and the U.S. Provisional Patent Application Ser. No. 62/092,937, entitled Apparatus for Airborne EM Surveying Using Three Component Transmitters, Receivers and Gradient Sensors", filed on Dec. 17, 2014 the disclosures of which are incorporated herein by reference.

TECHNICAL FIELD

The embodiments relate generally to the field of geophysical data acquisition and, more particularly, to methods and systems for airborne geophysical surveys.

BACKGROUND

Conducting geophysical surveys from above the ground can provide useful geophysical information. The data gathered from these surveys can be used to generate maps of information regarding subsurface features in oil, gas and mineral explorations. These geophysical surveys can include gravitational, magnetic, electromagnetic and radiometric measurements, etc. Airborne geophysical surveys have a number of advantages over land based surveys, such as, accessibility to remote areas and survey route flexibility. However, using aircraft also provides its own set of challenges. For example, airplanes and helicopters can use large amounts of fuel and introduce vibration/noise into the sensitive equipment used to perform such airborne geophysical surveys.

In this regard, airships present an alternative for geophysical surveys. Airships have been used in geophysical surveying due to their reduced geophysical noise levels during operation. An airship (also called a balloon, dirigible or blimp) is kept buoyant by a body of gas by using a large inflatable compartment or chamber which is filled with a gas that is lighter than air (usually hydrogen or helium). An airship differs from a conventional aircraft in that its source of lift is the buoyant gas it contains whereas a regular aircraft uses its engines to provide propulsion and achieves lift through its flight from aerodynamic wings. There is a subset of conventional aircraft known as gliders which also have aerodynamic wings but lack direct propulsion and require a tow to some altitude where they can use gravitational force to maintain airspeed and associated lift.

These lighter-than-air airships are, however, limited in several ways. For example, they have low payload/volume ratios. Additionally, ground handling of airships has historically presented great difficulty. When a purely lighter-than-air airship lands, being positively or neutrally buoyant, it is susceptible to wind buffeting. In even a slight breeze, a truck or many ground crew members are required to secure the airship to a mooring mast. Because of this, airships are prone to ground handling mishaps.

Accordingly, it would be desirable to provide methods and systems that avoid the afore-described problems and drawbacks.

SUMMARY

According to an embodiment, there is a method for performing a geophysical survey using a hybrid aircraft which includes an apparatus configured to perform the geophysical survey, the method comprising: transmitting by three mutually orthogonal transmitters electromagnetic (EM) waveforms towards the ground which creates a secondary magnetic field, wherein the three mutually orthogonal transmitters are attached to the hybrid aircraft; obtaining measurements associated with the secondary magnetic field by three mutually orthogonal null-coupled receivers, wherein the three mutually orthogonal null-coupled receivers are attached to the hybrid aircraft; and obtaining measurements by three mutually orthogonal gradient receivers, wherein the three mutually orthogonal gradient receivers are attached to the hybrid aircraft.

According to an embodiment, there is a system for performing a geophysical survey using a hybrid aircraft which includes an apparatus configured to perform the geophysical survey, the system comprising: three mutually orthogonal transmitters configured to transmit electromagnetic (EM) waveforms towards the ground which creates a secondary magnetic field, wherein the three mutually orthogonal transmitters are attached to the hybrid aircraft; three mutually orthogonal null-coupled receivers configured to obtain measurements associated with the secondary magnetic field, wherein the three mutually orthogonal null-coupled receivers are attached to the hybrid aircraft; and three mutually orthogonal gradient receivers configured to obtain measurements, wherein the three mutually orthogonal gradient receivers are attached to the hybrid aircraft.

According to an embodiment, there is a system comprising: a hybrid aircraft; and a three axis geophysical transmitter array, wherein the three axis geophysical array includes a set of three mutually orthogonal electromagnetic transmitters, wherein the transmitters are attached to the hybrid aircraft.

BRIEF DESCRIPTION OF THE DRAWINGS

The accompanying drawings illustrate exemplary embodiments, wherein:

FIG. 13(*b*) shows a hybrid aircraft and a three axis geophysical transmitter array which includes a set of three mutually orthogonal electromagnetic transmitters according to an embodiment; and FIG. 14 shows a method for performing a geophysical survey according to an embodiment.

DETAILED DESCRIPTION

Figure 1:
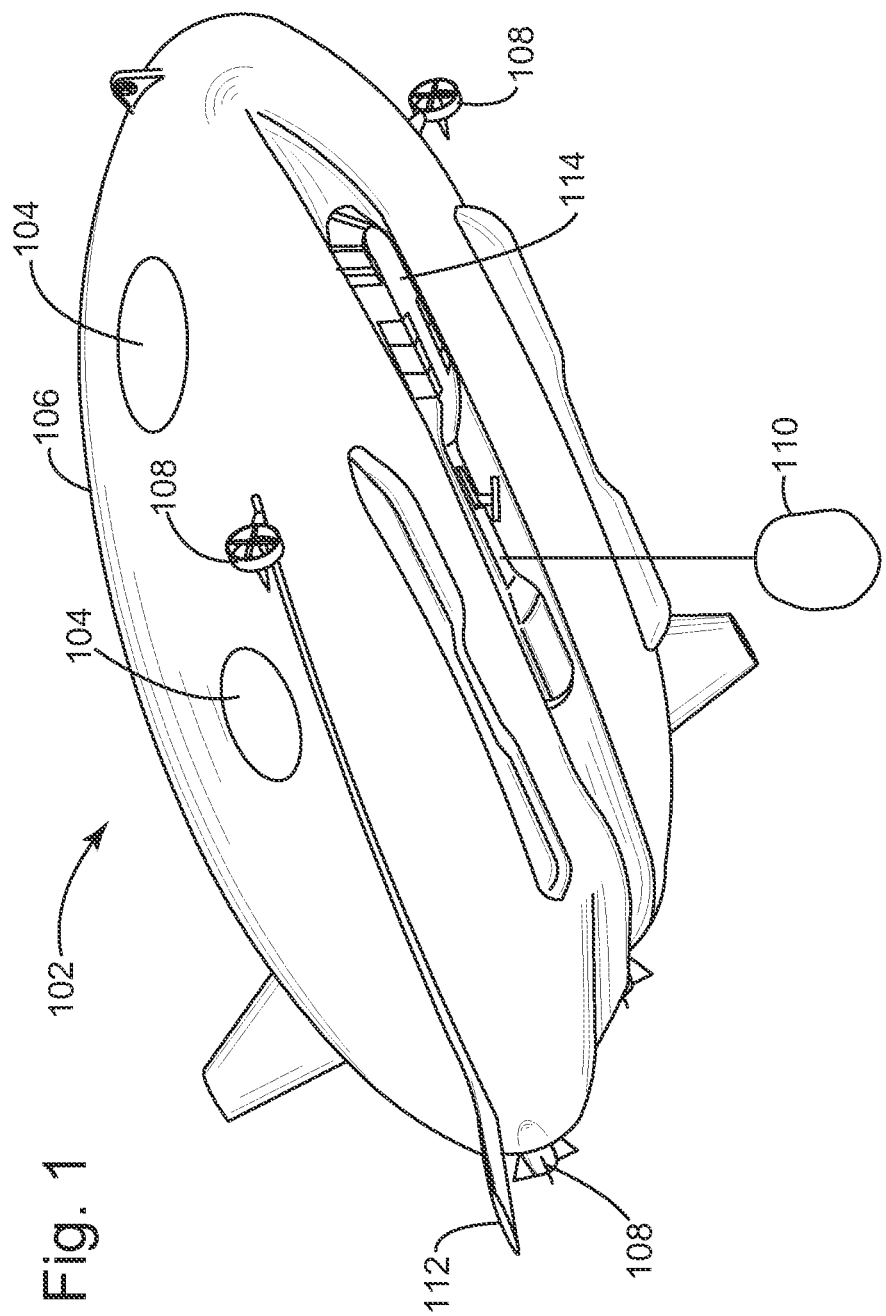
FIG. 1 shows a hybrid aircraft according to an embodiment.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

According to embodiments, and in order to address, among other things, the problems discussed in the Background, systems and methods for airborne geophysical surveys include using a so-called "hybrid aircraft" to perform geophysical, e.g., electromagnetic (EM) surveys. The hybrid aircraft uses thrust (from one or more engines) and/or aerodynamics, e.g., wings, and buoyancy, e.g., one or more lighter than air gas compartments, which have an amount of lift capable of supporting large scale geophysical and/or EM survey systems. This allows for the stability of an airship, coupled with the safer ground handling aspects of an aircraft with improved payloads, improved terrain following features as compared to either a conventional aircraft or a conventional airship used in areal geophysical and/or EM survey systems. Additionally, according to an embodiment, a hybrid aircraft can also include three mutually orthogonal transmitters, three mutually orthogonal null-coupled receivers and three mutually orthogonal gradient receivers to provide improved sensitivity to EM surveying systems as compared to conventional EM surveying systems.

According to an embodiment, the hybrid aircraft, also known as a hybrid air vehicle, which may be used interchangeably, refers to a hybrid aircraft which combines the characteristics of heavier-than-air technology, fixed-wing airplane or rotor wing helicopter, with lighter-than-air (for example, hydrogen or helium) aerostat technology of a traditional airship. Hybrid aircraft can be similar in size or larger in size than traditional airships while being heavier than air and generating up to 50% of their lift from aerodynamics and/or engine thrust.

As such, hybrid aircraft are heavier than air and airships are lighter than air. Hybrid aircraft derive lift from buoyant gas plus engine thrust or aerodynamics. Advantageously as a result, hybrid aircraft can handle severe weather better than airships, particularly on the ground. Additional advantages are that, hybrid aircraft can follow terrain better and have a higher payload capacity than airships. Finally, hybrid aircraft have same desirable attributes of stability and slow speed as airships.

An example of an exemplary hybrid aircraft 102 is now described with respect to FIG. 1. The hybrid aircraft 102 includes a shell or envelope 106 inside of which are one or more buoyancy chambers 104 which contain a lighter than air gas. According to an embodiment, the hybrid aircraft may have a rigid gas envelope. The whole rigid gas envelope may be covered with fabric, sometimes referred to as an envelope, to enable a better aerodynamic style. According to an embodiment, helium is contained within the envelope, and can be stored in three separate cells, or other number of cells as desired. Inflatable and deflatable air chambers can be provided for steering or other purposes in addition to the inflatable lifting gas cells. The size of the buoyancy chambers 104 can be a fixed or variable volume, e.g., include the ability to release amounts of the lighter than air gas when desiring to decrease altitude. The shell 106 may be rigid or flexible as desired. Attached to the shell 106 are one or more propulsion units 108. The hybrid aircraft can carry or include an apparatus 110 which can be configured to perform the functions of a geophysical and/or EM survey. Additionally, a cabin 114 can be included to allow for crew and/or equipment in support of measurements for performing the geophysical and/or EM survey as well as for control of the hybrid aircraft 102. According to an embodiment, a plurality of sensors can be provided for collecting signals for use with electromagnetic systems or other detection/measurement system (or systems) used as desired. The sensors may be located either inside, outside, or some combination thereof with respect to the aircraft gas envelope and other structural components.

According to an embodiment, the propulsion units 108 can provide a propulsion force via thrusters, fans, propellers, or other known methods. The forward motion of the aircraft may cause air to flow over one or more lift surfaces 112 that generate an aerodynamic vertical lift force. The lift surfaces 112 can be attached to the shell 106 or formed as part of the shell 106. Additionally, the propulsion units 108 can be fixed or rotatable as desired. Some of the propulsion units 108 may be used more for positioning than for forward thrust purposes as desired. According to an embodiment, the hybrid aircraft's control surfaces and propulsion units as well as a control car or gondola can be supported by the aircraft's rigid frame. For example, forward propellers rotatable to 120 degrees and with reversible pitch control can be attached to the sides of the aircraft (only one is shown). At the rear of the aircraft, a single engine may drive two propellers, e.g., a large rotatable fan facing to the rear or straight down and a smaller propeller horizontally mounted at ninety degrees to the centerline, for example.

According to an embodiment the hybrid aircraft may be manned or unmanned. For an unmanned hybrid aircraft, it may include an autopilot system which may be remote or installed on the aircraft to control operation of the aircraft. All or some of the operations performed by the unmanned aircraft control station may be performed from location on the ground or in another aircraft.

As described above, hybrid aircraft can be used to perform geophysical surveys. A geophysical survey is conducted to measure, for example, gravitational, magnetic, electromagnetic and radiometric properties of an area of interest. According to an embodiment, a three-component transmitter electromagnetic system with ancillary sensors such as gravity, gravity gradients, magnetic, radiometric, etc., is mounted on a hybrid aircraft for geophysical surveys. To perform the geophysical survey a series of nominally parallel survey lines, or other desired pattern, can be flown until the total region to be surveyed has been covered.

According to an embodiment, to assist in performing the geophysical survey, the hybrid aircraft may also include global positioning survey (GPS) equipment, radar/laser altimeter, accelerometers and/or gyroscopes to provide information regarding the position and orientation on the hybrid aircraft 102, and consequently the position and orientation of affixed transmitters and receivers. A wireless communications link can be provided to communicate this information to a ground control system which can then monitor operation of the hybrid aircraft 102. The hybrid aircraft 102 may be pre-programmed to fly a predetermined survey flight pattern which is monitored by the ground station.

Figure 2:
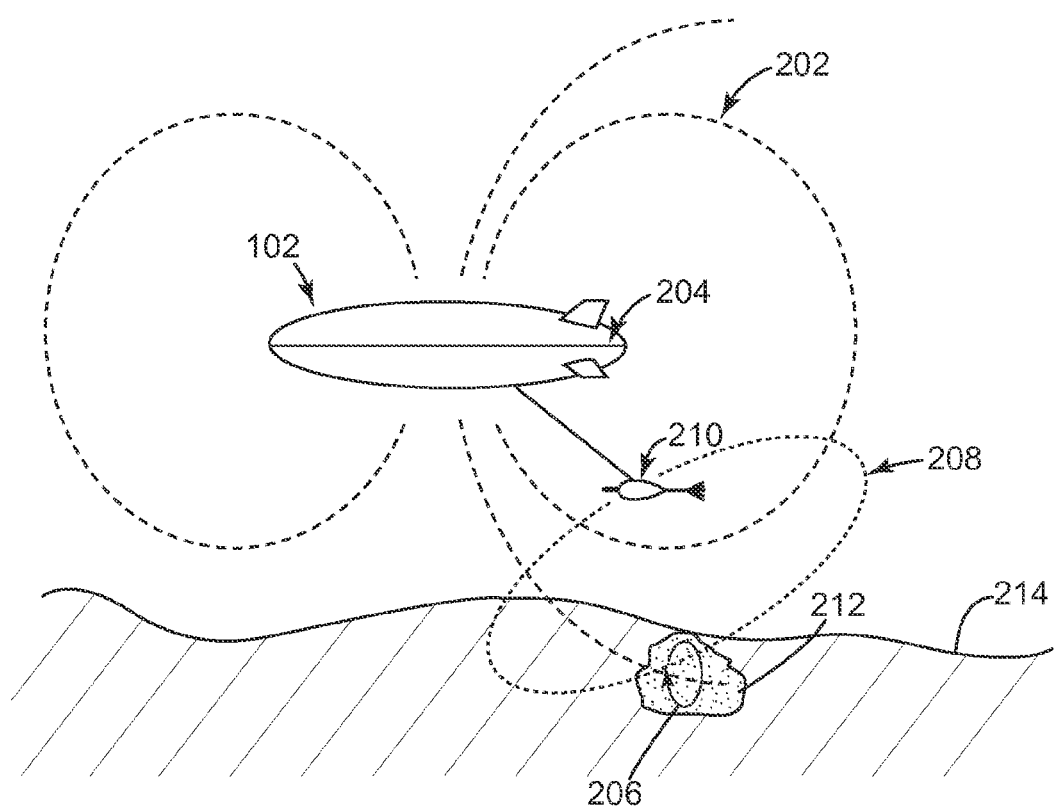
FIG. 2 shows an electromagnetic (EM) system with a hybrid aircraft according to an embodiment.

Illustrated in FIG. 2 is an airborne EM system using the hybrid aircraft 102, wherein the primary field 202 is created by passing a current through a transmitter coil 204 (or series of transmitter coils). The temporal changes to the created or radiated magnetic field induce electrical eddy currents 206 in the ground 214, the eddy currents being usable in finding resources of interest, e.g., ore body 212. These eddy currents have an associated secondary magnetic field 208 that can be sensed, together with the primary field, by one or more receiver coils 210.

Figure 3:
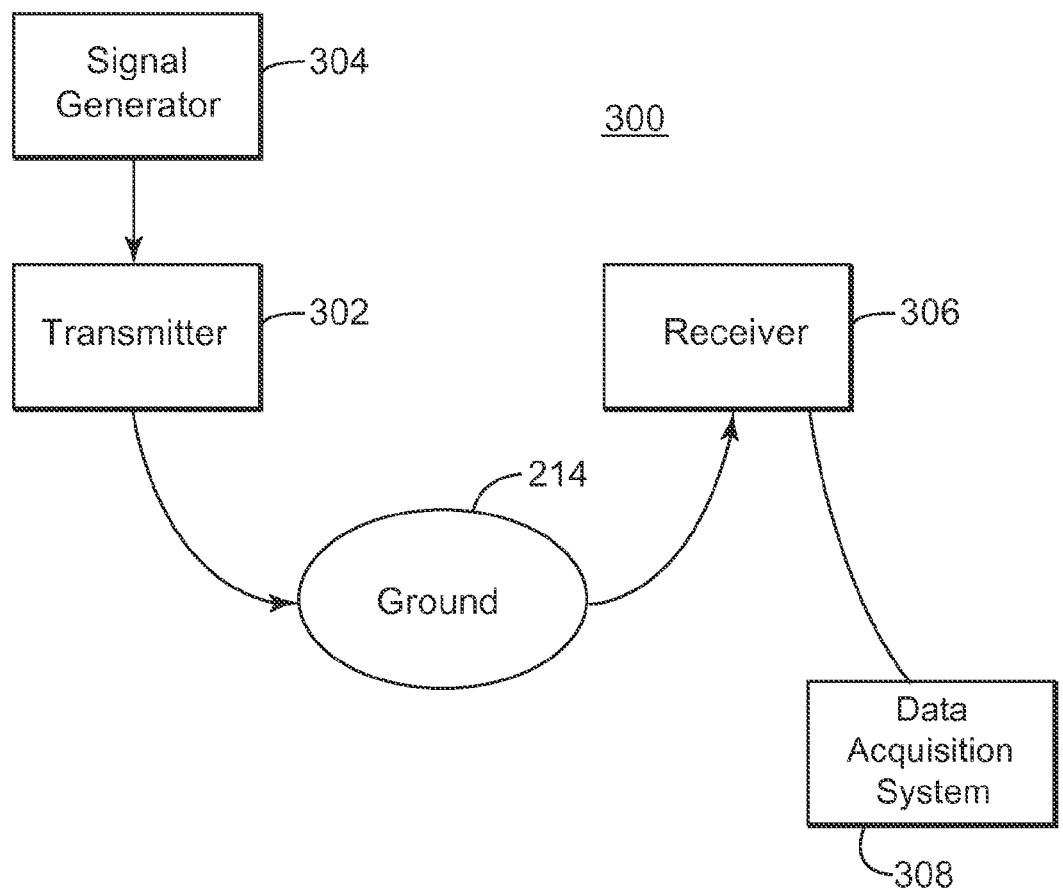
FIG. 3 illustrates an EM system according to an embodiment.

Embodiments may be implemented as an electromagnetic (EM) system such as the one depicted in FIG. 3. Referring to FIG. 3, the EM system 300 includes a transmitter 302, and may include a signal generator 304, and a receiver 306. The configuration, construction and operation of the receiver 306 and the associated receiver coils can be provided in accordance with known systems and methods and as such is not described in more detail here. Additionally, according to an embodiment, the EM system 300 can forward the data received by the receiver 306 to a data acquisition system 308 for further processing and/or display and use of the data.

Figure 4:
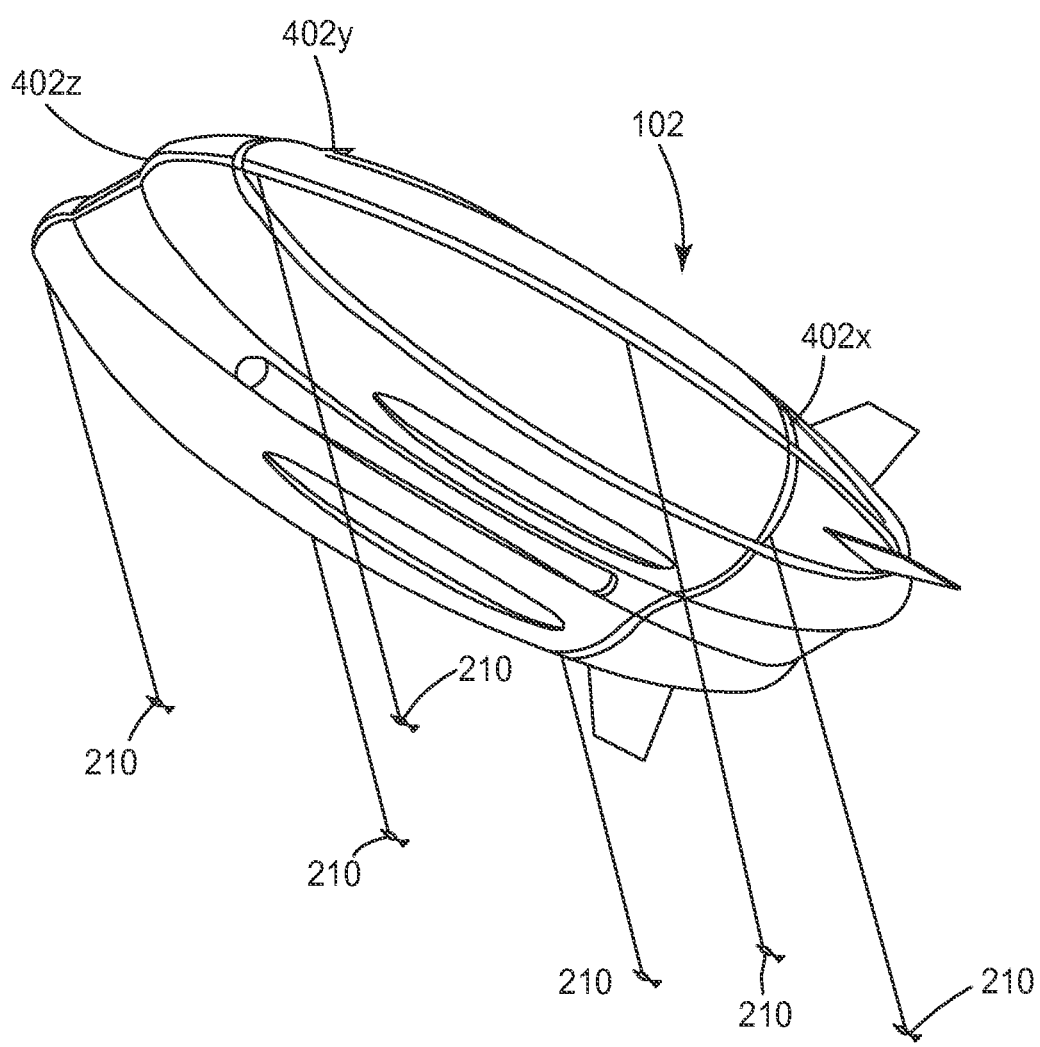
FIG. 4 shows the hybrid aircraft with transmitting coils according to an embodiment.

According to another embodiment, as illustrated in FIG. 4, the hybrid aircraft 102 may include at least one of three transmitting coils 402x, 402y and 402z to generate signals for the EM systems. Each of the transmitting coils 402x, 402y and 402z includes a coil of wire extending around the gas envelope of the aircraft 102. For example, a first transmitting coil 402x is oriented in a vertical plane extending around the gas envelope of the aircraft 102 transversely to the longitudinal axis of the hybrid aircraft 102 thereby having a dipole moment on the X-axis and referred to as the x-coil 402x. The x-coil 402x may be located generally midway between the nose and the tail to maximize its area. A second transmitting coil 402y is oriented in a vertical plane extending around the envelope 106 of the aircraft 102 from the nose to the tail with a dipole moment on the Y-axis and referred to as the y-coil 402y. A third transmitting coil 402z is oriented in a horizontal plane extending around the gas envelope of the hybrid aircraft 102 from the nose to the tail with a dipole moment on the Z-axis and referred to as the z-coil 402z.

According to an embodiment, the transmitting coils 402x, 402y and 402z are generally elliptical in shape. Alternatively, the transmitting coils 402x, 402y and 402z can be other shapes that can be accommodated by the hybrid aircraft 102. The receivers 210 that measure the ground response from the transmitting coils 402x, 402y, and 402z may be towed below the hybrid aircraft 102. The use of one or more three-component receiver(s) 210, along with the orientations of the transmitting coils 402x, 402y, and 402z thereby allow collection of data in three different orthogonal directions, being nominally vertically perpendicular to the direction of flight, horizontally parallel to the direction of flight and horizontally perpendicular to the direction of flight. According to an embodiment, the use of the relatively large three-component transmitting coils 402x, 402y, and 402z on the hybrid aircraft 102 and a three-component receiver 210 allows a 3D inversion to be derived in which the conductivity of the subsurface of the earth is represented over the surveyed area.

According to an embodiment, the additional payload of the hybrid aircraft 102, as compared to the payload of traditional aircraft or helicopters, may also be used to carry a large auxiliary power unit (not shown) with sufficient electrical capacity to increase the output power of one or more of the transmitter coils 402x, 402y and 402z by a factor of twenty or more. For example, the transmitter power of the hybrid aircraft 102's EM system may be as much as forty million amp-meters square ($Am^2$) whereas the most powerful systems currently mounted on helicopter or aircraft are in the order of two million $Am^2$. The null-coupled receiver allows for increases in transmitter moment without sacrificing receiver sensitivity.

When considering the depth of exploration in electromagnetic geophysics, a consideration is the signal-to-noise ratio. The signal from the object of interest preferably exceeds the system noise level, typically by a factor of one to five. Provided that the object of interest is relatively far from the transmitter, the signal strength scales linearly with increasing transmitter strength, while at later delay times the noise is approximately independent of transmitter strength.

Figure 5:
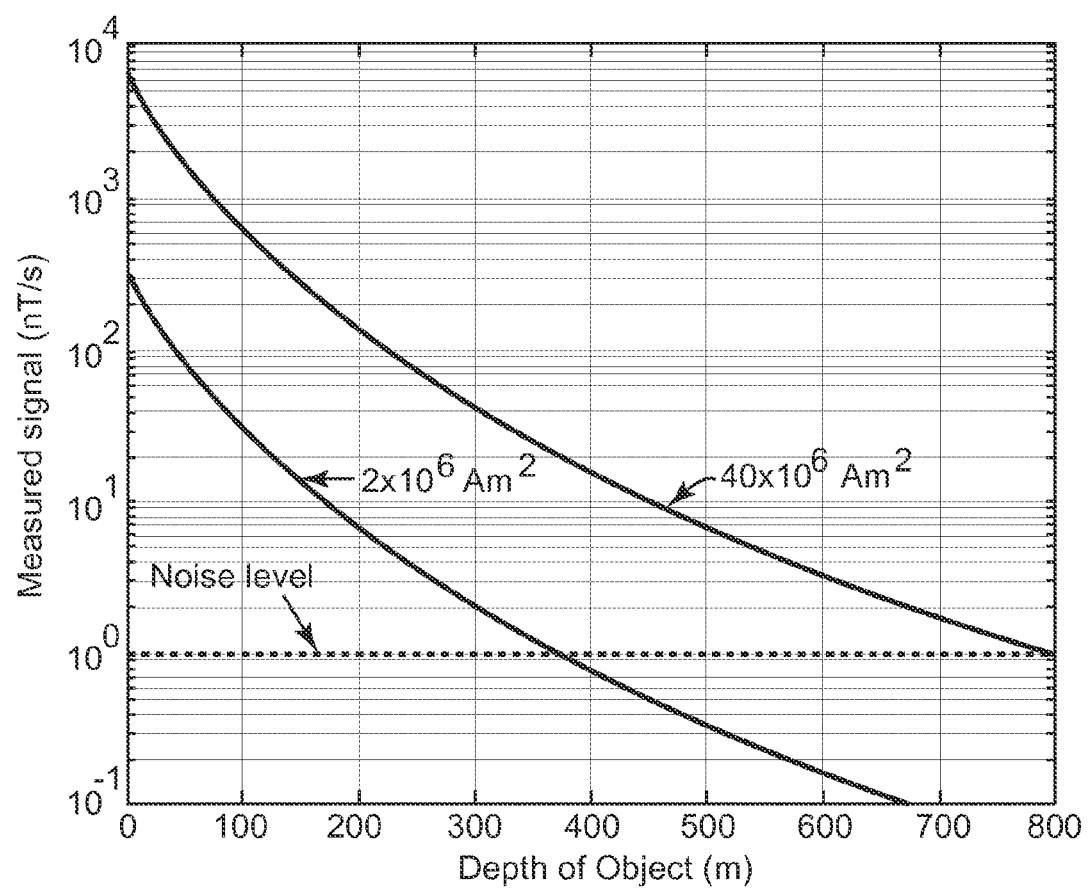
FIG. 5 shows a graph of signal strength versus object depth according to an embodiment.

The graphic in FIG. 5 illustrates the signal level due to a hypothetical flat plate shaped target at increasing depth resulting from a transmitter with moment of two million $Am^2$ and forty million $Am^2$ with reference to a hypothetical system noise level. Using a simple metric that the object is detectable if the signal is at least equal to the noise level, the figure shows that a factor of twenty-time increase in transmitter strength approximately doubles the depth of exploration. The factor(s) relating an increase in transmitter strength to the increase in depth of exploration depends on the relative geometry and size of the object of interest and the transmitter, however, an increase of this magnitude will typically result in a significant improvement in depth of exploration.

Information during the survey can be collected and stored by the data acquisition system 308. This collected information may be used to create a map of the collected geophysical data over the survey area. During operation, information regarding the orientation of the hybrid aircraft 102 may also be collected and stored over the survey area. This information regarding the orientation of the hybrid aircraft 102 is then used to correct for the error in the acquired data introduced by the pitch, yaw and roll of the hybrid aircraft 102.

In one embodiment, the survey system is a time domain electromagnetic (TDEM) system. An airborne TDEM survey system is disclosed for example, in International Patent Publication No. WO 2013/067624 by Miles et al, the disclosure of which is hereby incorporated by reference, and provides non-exhaustive examples of an airborne TDEM geological survey system that can be used with hybrid aircraft 102.

Figure 6:
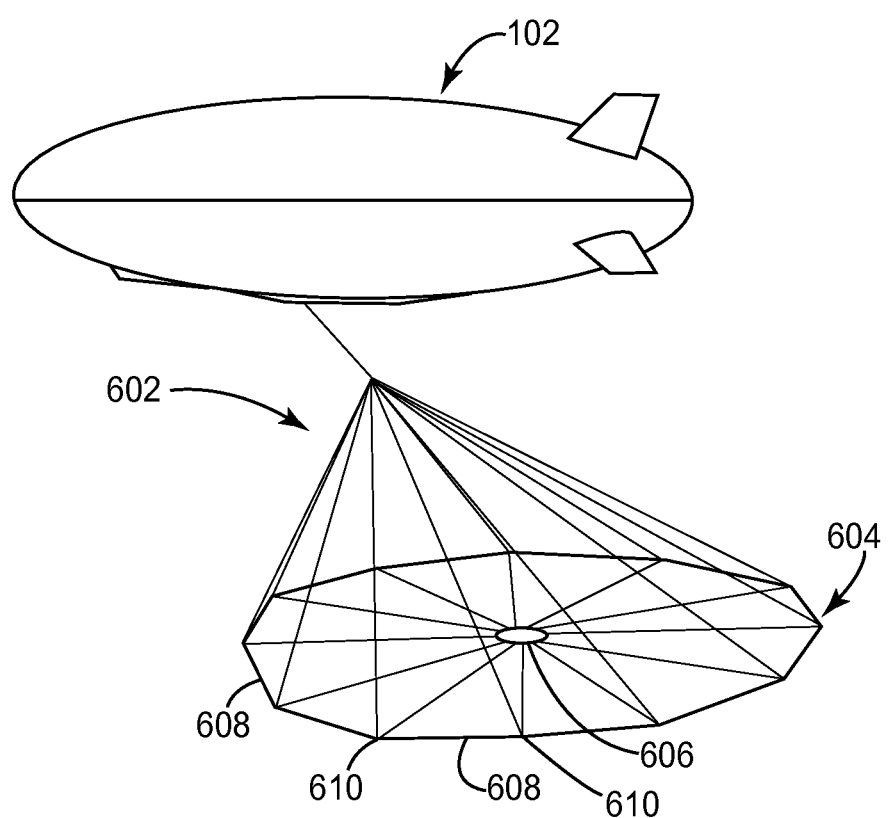
FIG. 6 depicts the hybrid aircraft towing an EM system according to an embodiment.

According to an embodiment, as shown in FIG. 6, the hybrid aircraft 102 is towing an EM survey system 600 which includes a tow assembly 602. The tow assembly 602 includes a transmitter section 604 and a receiver section 606. The receiver section 606 may be located above, within, or below the transmitter section 604. The transmitter section 604 may include a transmitter loop frame which supports a transmitter loop coil for generating a primary electromagnetic field that induces a secondary electromagnetic field in the ground. The transmitter frame can be constructed with tubular sections 608 that are serially connected at a plurality of joints 610 as shown. Additionally, various types of transmitters or generators can be used as a source of electromagnetic energy. In such embodiments additional positioning and orientation sensors can be distributed on the external transmitter and receiver assemblies.

According to another embodiment, the hybrid airship 102 can contain an apparatus, e.g., an electromagnetic (EM) surveying system, which includes three mutually orthogonal transmitters, three mutually orthogonal null-coupled receivers, where the null-coupled receivers can be concentric to their respective transmitters, and three mutually orthogonal gradient receivers. The transmitters and receivers can be arranged symmetrically about a common inversion point to provide improved sensitivity to subsurface conductors of arbitrary geometry as compared to conventionally used EM surveying systems on hybrid airships. Alternatively, other transmitter and receiver arrangements around the common inversion point can be used as desired. Additionally, while the following embodiments describe using three mutually orthogonal transmitters, three mutually orthogonal null-coupled receivers and three mutually orthogonal gradient receivers, other physical combinations of such could be used.

Figure 7:
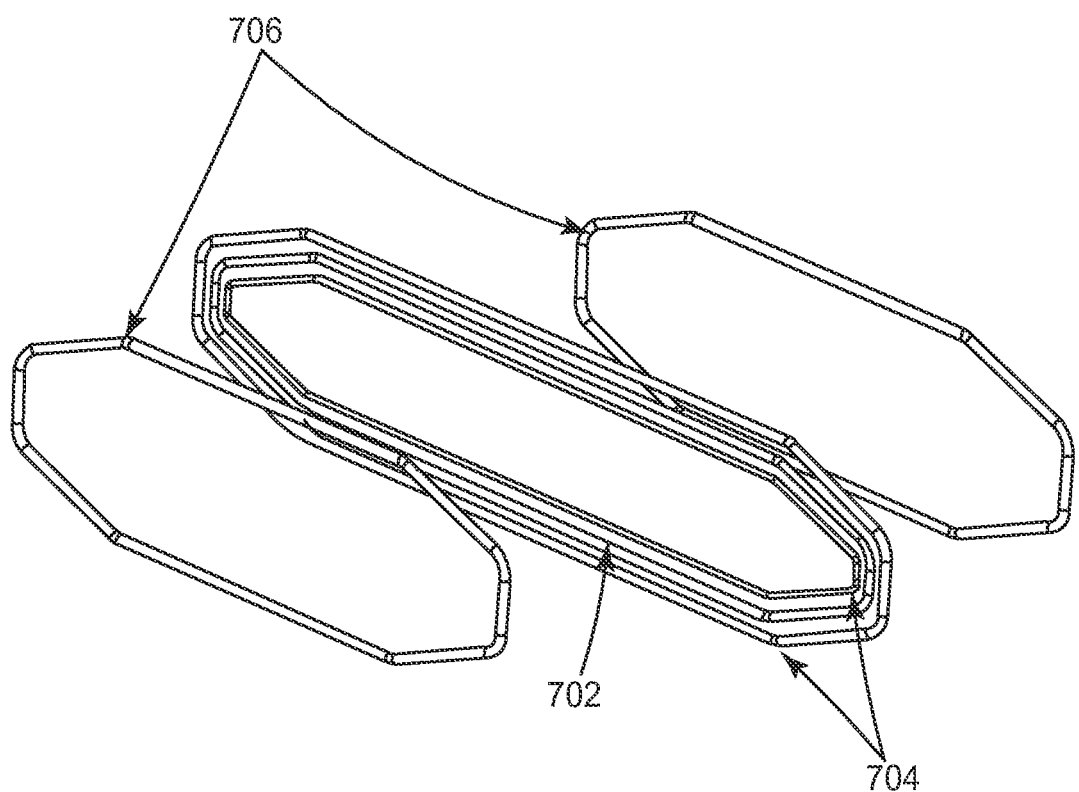
FIG. 7 shows a view of the component sensors aligned to the horizontal longitudinal (X) axis of an apparatus according to an embodiment.
Figure 8:
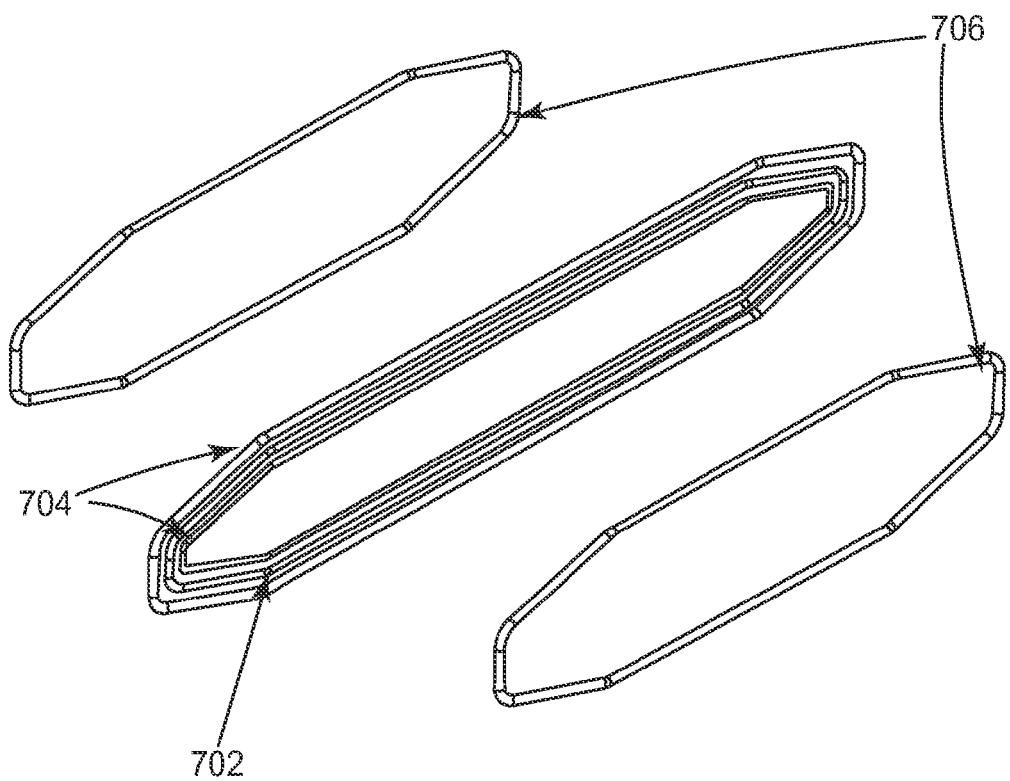
FIG. 8 shows a view of the component sensors aligned to the horizontal lateral (Y) axis of the apparatus according to an embodiment.
Figure 9:
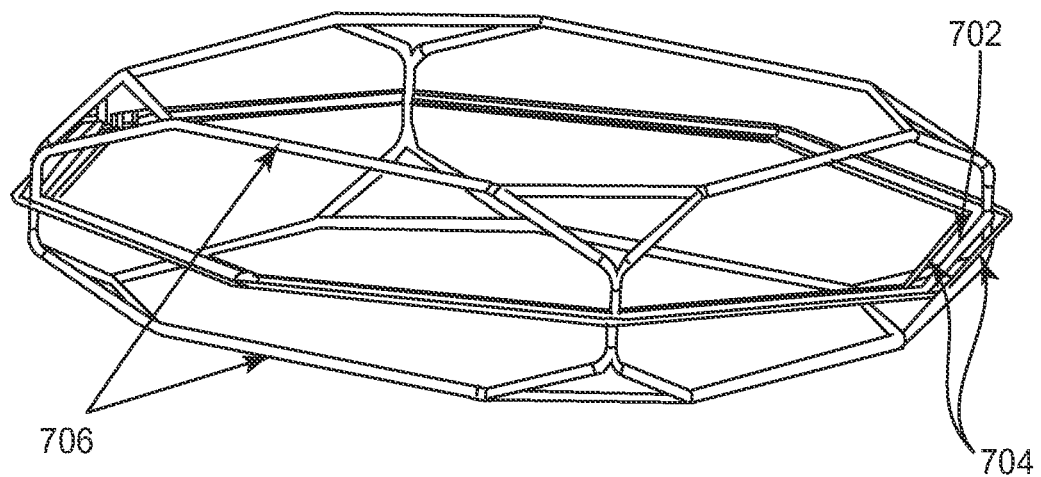
FIG. 9 shows a view of the component sensors aligned to the vertical (Z) axis of the apparatus according to an embodiment.
Figure 10:
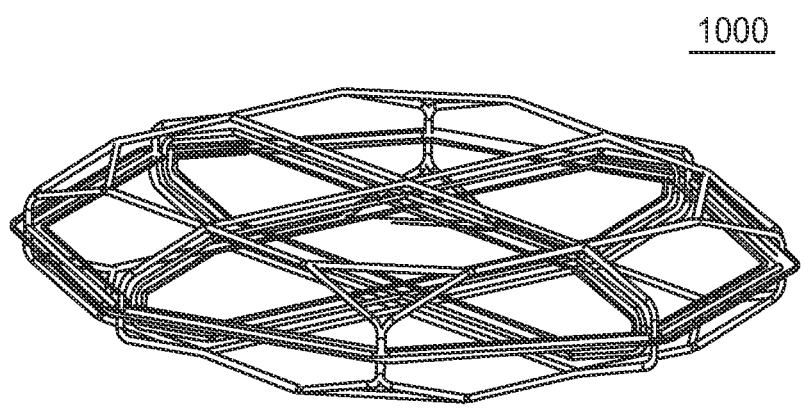
FIG. 10 depicts the apparatus according to an embodiment.

An example of this can be seen in FIGS. 7-10 which show various portions of the apparatus. FIG. 7 shows a view of the horizontal longitudinal sensors (X axis), FIG. 8 shows a view of the horizontal lateral sensors (Y axis), FIG. 9 shows a view of the vertical sensors (Z axis) and FIG. 10 depicts a combination of FIGS. 7-9. In FIGS. 7-10 the apparatus 1000 and the various components, e.g., the transmitters 702, the null-coupled receivers 704 and the symmetric gradient receivers 706, are shown. By incorporating structural elements, the apparatus in FIGS. 7-10 is not limited to installation within a hybrid aircraft and may be towed beneath a different type of aircraft, e.g., a helicopter.

According to an embodiment, the apparatus 1000 can include a three component transmitter 702, which includes transmitter coils and requisite electrical components and controllers, capable of continuous transmission of arbitrary waveforms at similar or unique pulse repetition rates. Additionally, as described above, the apparatus 1000 includes three null-coupled receivers 704 which include receiver coils about each transmitter axis and a symmetric gradient receiver 706, which include receiver coils distinct from the receiver coils used in the three null-coupled receivers 704, for each axis and this provides eighteen measurements of the EM field for each transmitter firing sequence. Each of the null-coupled receiver coils measures an axial component of the total secondary field. This information is used to derive ground conductivities and depths. An example of a single axis concentric null-coupled receiver can be found in U.S. Pat. No. 7,646,201, the disclosure of which is incorporated herein by reference.

Figure 11:
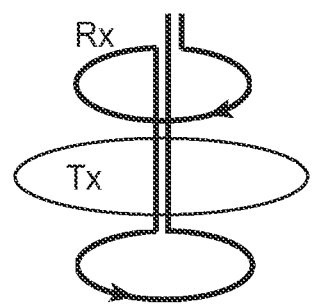
FIG. 11 illustrates a symmetric gradient receiver according to an embodiment.
Figure 12:
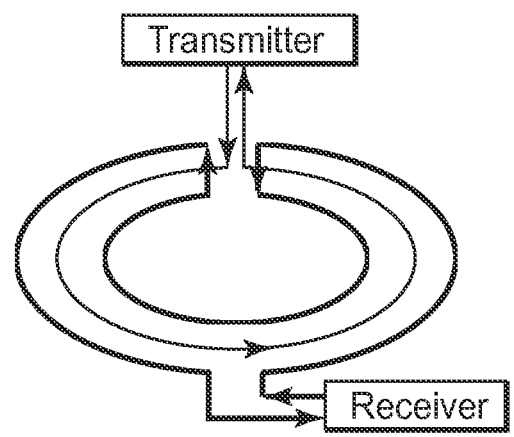
FIG. 12 illustrates a null-coupled receiver according to an embodiment.

According to an embodiment, null-coupled coils may be but are not necessarily concentric as there are other geometric arrangements which can result in null-coupled transmitter-receiver pairings. According to an embodiment, a null-coupled receiver 704 is concentric to its particular transmitter 702, but not concentric to the other null-coupled receivers 704 or other transmitters 702 of the apparatus 1000. For example, the z-component null-coupled receiver is concentric to and null-coupled to the z-component transmitter, while having no relation to the x-component or y-component Gradient receivers sense the change in EM field strength over the separation distance. According to an embodiment, the gradient receiver 706 is constructed to be equally spaced about the transmitter 702 and this can be seen, for example, in FIG. 9. Because the gradient receivers 706 are centered and equally spaced about the transmitter loop, the pair of gradient coils is subjected to the same primary field magnitude and the measured primary field is zero. The gradient of the secondary field provides information about the geometry of discrete conductors, improves near-surface sensitivity, and can be used to enhance gridding of the axial components of the total field. The measurements can be combined to enhance near surface, lateral and/or vertical conductive targets. Gradient receivers can also be remote from the transmitter (for example towed below the hybrid aircraft so the receiver is closer to the ground) in which case the primary field is not zero. The benefit of having the gradient receiver closer to the ground is that the gradient signal is stronger. According to an embodiment, a schematic of the symmetric gradient receiver 706 is shown in FIG. 11 and a schematic of the null-coupled receiver 704 is shown in FIG. 12.

Figure 13A:
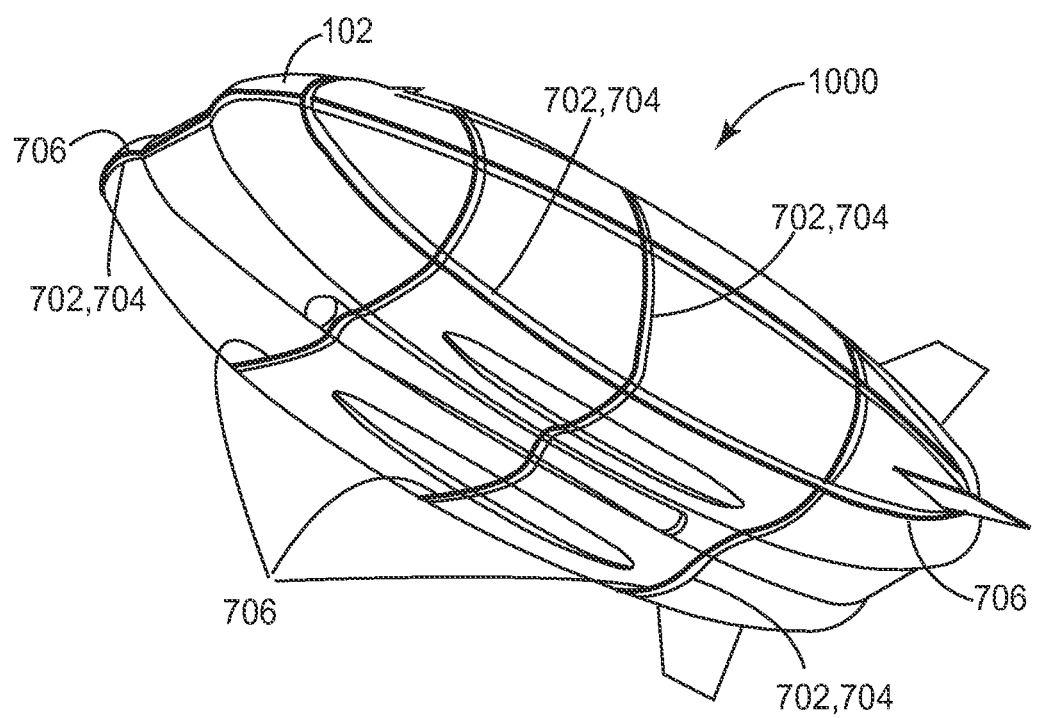
FIG. 13(*a*) shows the hybrid aircraft with the apparatus according to an embodiment.
Figure 13B:
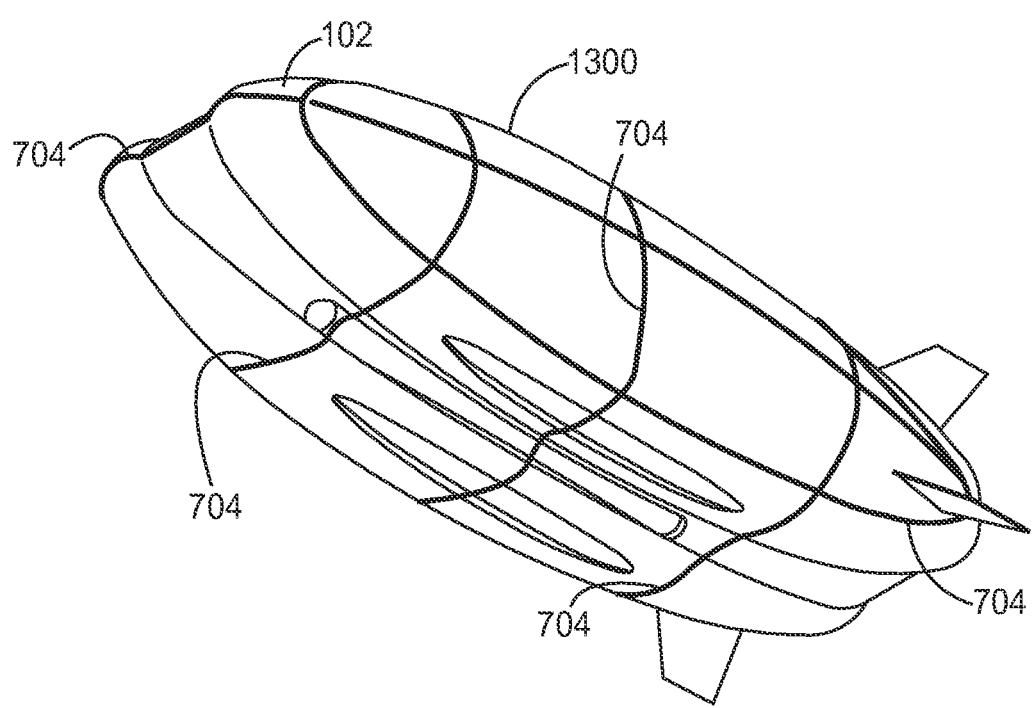

According to an embodiment, the apparatus 1000 can be substantially composed of composite structures formed in such a way as to provide a symmetric three component transmitter. Another example of this is shown in FIG. 13(*a*) in which the apparatus 1000 is mounted to a hybrid aircraft 102. The transmitters may be of a same physical size, e.g., cover a similar amount of area or space, however, according to an embodiment inflight loading related to airflow over the structures can limit the practical size of the vertically perpendicular and horizontally perpendicular (relative to the direction of flight of the hybrid aircraft 102) transmitters to approximately 20 percent to 50 percent of the horizontally parallel coils of the apparatus 1000. The transmitter structure may be tubular or a composite I-beam. Due to scaling considerations the transmitters 702 and null-coupled receivers 704 are shown together (thinner lines as compared to the gradient receivers 706), however FIGS. 7-10 more accurately represent their configuration with respect to each other.

According to another embodiment, as shown in FIG. 13(*b*) there is a system including the hybrid aircraft 102 and a three axis geophysical transmitter array 1300 which includes a set of three mutually orthogonal electromagnetic transmitters 702, wherein the transmitters 704 are attached to the hybrid aircraft 102.

According to an embodiment, the transmitters can be collocated forming a substantially rigid structure which can be attached to the hybrid aircraft 102. According to an embodiment, one example transmitter pulse repetition frequencies include 30 Hz for each axis if fired sequentially or 29.5 Hz, 30.0 Hz and 31 Hz in each of the X, Y and Z axis, respectively, when not fired sequentially. Using different frequencies allows, in post processing, separation of the secondary signals to identify the causative transmitter. In some operating environments, the transmission of similar waveforms on each axis at the same pulse repetition rate can occur. A base frequency of 30 Hz is chosen for environments with 60 Hz mains to cancel ambient powerline transmission noise. The system can be configured to a different base frequency, e.g. 25 Hz as appropriate. According to an embodiment, the power levels for each axis of the apparatus 1000 to direct the primary magnetic field towards an arbitrary direction can be controllable and changeable such that the same or different power levels are used on each axis. Additionally, the power levels may also be controlled in a continuously varying fashion to essentially sweep the resulting magnetic field to ensure maximum coupling of the directed field with a conductive target of arbitrary geometry. This control and execution associated with the power levels for each axis can be used in various fields of mapping, e.g., unexploded ordnance (UXO) mapping.

According to an embodiment, a null-coupled receiver is rigidly connected to the inner and outer elements of each transmitter tubular or I-beam structure. The transmitter structure is formed in such a way as to locate the receiver windings such that the enclosed receiver area contains substantially equal and opposite components of the transmitted field. This transmitter structure provides an overall increase in sensitivity to the secondary fields of interest. According to an embodiment, the apparatus can include one or more adjustable components to fine tune the primary nulling fields in each axis.

As described above, the additional payload of the hybrid aircraft 102, as compared to the payload of traditional aircraft or helicopters, may also be used to carry a large auxiliary power unit (not shown). According to an embodiment, the large auxiliary power unit can have sufficient electrical capacity to increase the output power of one or more of the three mutually orthogonal transmitters 702. For example, the transmitter power of the hybrid aircraft 102's EM system may be as much as forty million amp-meters square ($Am^2$) whereas the most powerful systems currently mounted on helicopter or aircraft are in the order of two million $Am^2$.

Utilizing the above-described systems according to an embodiment, there is a method for performing a geophysical survey using a hybrid aircraft which includes an apparatus configured to perform the geophysical survey as shown in FIG. 14. The method includes: at step 1402, transmitting by three mutually orthogonal transmitters electromagnetic (EM) waveforms towards the ground which creates a secondary magnetic field, wherein the three mutually orthogonal transmitters are attached to the hybrid aircraft; at step 1404, obtaining measurements associated with the secondary magnetic field by three mutually orthogonal null-coupled receivers, wherein the three mutually orthogonal null-coupled receivers are attached to the hybrid aircraft; and at step 1406, obtaining measurements by three mutually orthogonal gradient receivers, wherein the three mutually orthogonal gradient receivers are attached to the hybrid aircraft. Furthermore, the obtained measurements can be processed and displayed as desired to show the results of the geophysical survey.

Further, the systems disclosed herein for airborne geophysical measurements using a hybrid aircraft are equipped with at least one of geophysical instrument. In some embodiments, a magnetometer to measure the distortions and additions to the magnetic field of the earth due primarily to the rocks and minerals, as well as any other anthropogenic anomalies, below the hybrid aircraft may be included. In some embodiments, radiometric sensors to measure the radioactive emanations from the radioactive isotopes of the elements that are the constituent components of the rocks and earth below the hybrid aircraft may be used. Further, in other embodiments, passive electromagnetic sensors to measure low frequency electromagnetic fields caused by natural electromagnetic sources may be used. In addition, in other embodiments, active frequency domain or time domain electromagnetic geophysical survey systems to measure the effects of the electrical conductivities of the rocks and minerals below the aircraft may be used. In other embodiments, auxiliary electrical power generation equipment for the electromagnetic transmitter may be used.

In other embodiments, gravimeter sensors or gravity gradiometers to measure the gravitational field, from which the density of the rocks and minerals below the hybrid aircraft can be inferred may be used. In other embodiments hyperspectral scanners to measure the reflectance spectra of the rocks, earth and vegetation below the hybrid aircraft, etc. may be used. Various options and combinations of the geophysical measurements and/or additional sensors or transmitters may be used. The geophysical data collected from airborne measurements using at least one of the above of geophysical equipment is then interpreted. According to an embodiment, all or parts of the geophysical survey equipment can be located in the hybrid aircraft, integrated into the aircraft structure, or towed behind or below.

As disclosed herein, geophysical surveys may be conducted using a hybrid aircraft with the geophysical survey equipment described above to cover large land areas in an efficient manner. In a turbulent environment, the hybrid aircraft provides a more stable surrounding for collecting data. Flying at low speeds, the hybrid aircraft can also maneuver more easily. Further, areas that may not be surveyable using an aircraft can be surveyed using a hybrid aircraft. For example, planes may not be able to fly sufficiently close to areas with steep hills or with varying terrain, whereas a hybrid aircraft may be able to maneuver more effectively above such terrains. Using a hybrid aircraft to collect geophysical data can also allow for longer data collection periods. For example, hybrid aircraft have higher fuel efficiency than a fixed wing or rotor wing aircraft platform at slow speeds, which can result in longer duration and lower cost surveys. A hybrid aircraft may be able to conduct geophysical surveys for many hours or even days before refueling.

The disclosed embodiments provide systems and methods associated with geophysical acquisition operations, e.g., performing a geophysical survey. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims. No element, act, or instruction used in the description of the present application should be construed as critical or essential to the invention unless explicitly described as such. Also, as used herein, the article "a" is intended to include one or more items.

What is claimed is:

1. A method for performing a geophysical survey using a hybrid aircraft which includes an apparatus configured to perform the geophysical survey, the method comprising:
    transmitting by three mutually orthogonal transmitters electromagnetic (EM) waveforms towards the ground which creates a secondary magnetic field, wherein the three mutually orthogonal transmitters are attached to the hybrid aircraft;
    obtaining measurements associated with the secondary magnetic field by three mutually orthogonal null-coupled receivers, wherein the three mutually orthogonal null-coupled receivers are attached to the hybrid aircraft; and
    obtaining measurements by three mutually orthogonal gradient receivers, wherein the three mutually orthogonal gradient receivers are attached to the hybrid aircraft.

2. The method of claim 1, wherein the hybrid aircraft includes a propulsion element and at least one buoyancy element, wherein the at least one buoyancy element contains a lighter than air gas.

3. The method of claim 1, further comprising:
    transmitting at a transmitter pulse repetition frequency of 30 Hz when firing each of the three mutually orthogonal transmitters sequentially.

4. The method of claim 1, further comprising:
    transmitting at a transmitter pulse repetition frequency of 29.5 Hz for a first one the three mutually orthogonal transmitters;
    transmitting at a transmitter pulse repetition frequency of 30 Hz for a second one the three mutually orthogonal transmitters; and
    transmitting at a transmitter pulse repetition frequency of 31 Hz for a third one the three mutually orthogonal transmitters,
    wherein the transmitters are fired non-sequentially.

5. The method of claim 1, further comprising:
    controlling a power level for each axis of the apparatus for steering or sweeping of a primary magnetic field.

6. The method of claim 5, wherein the power level is the same for each axis of the apparatus.

7. The method of claim 5, wherein the power level is different for each axis of the apparatus.

8. A system for performing a geophysical survey using a hybrid aircraft which includes an apparatus configured to perform the geophysical survey, the system comprising:
    three mutually orthogonal transmitters configured to transmit electromagnetic (EM) waveforms towards the ground which creates a secondary magnetic field, wherein the three mutually orthogonal transmitters are attached to the hybrid aircraft;
    three mutually orthogonal null-coupled receivers configured to obtain measurements associated with the secondary magnetic field, wherein the three mutually orthogonal null-coupled receivers are attached to the hybrid aircraft; and
    three mutually orthogonal gradient receivers configured to obtain measurements, wherein the three mutually orthogonal gradient receivers are attached to the hybrid aircraft.

9. The system of claim 8, wherein the hybrid aircraft further comprises:
    a propulsion element and at least one buoyancy element, wherein the at least one buoyancy element contains a lighter than air gas.

10. The system of claim 8, further comprising:
    the three mutually orthogonal transmitters configured to transmit at a pulse repetition frequency of 30 Hz when firing each of the three mutually orthogonal transmitters sequentially.

11. The system of claim 8, further comprising:
    a first one of the three mutually orthogonal transmitters configured to transmit at a pulse repetition frequency of 29.5 Hz;
    a second one of the three mutually orthogonal transmitters configured to transmit at a pulse repetition frequency of 30 Hz; and
    a third one of the three mutually orthogonal transmitters configured to transmit at a transmitter pulse repetition frequency of 31 Hz, wherein the transmitters are fired non-sequentially.

12. The system of claim 8, wherein a power level for each axis of the apparatus is controllable for steering or sweeping of a primary magnetic field.

13. The system of claim 12, wherein the power level is the same for each axis of the apparatus.

14. The system of claim 12, wherein the power level is different for each axis of the apparatus.

15. A system comprising:
    a hybrid aircraft;
    a three axis geophysical transmitter array, wherein the three axis geophysical array includes a set of three mutually orthogonal electromagnetic transmitters, wherein the transmitters are attached to the hybrid aircraft;
    a set of three mutually orthogonal null-coupled receivers, wherein the set of three mutually orthogonal null-coupled receivers are attached to the hybrid aircraft; and
    a set of three mutually orthogonal gradient receivers configured to obtain measurements, wherein the set of three mutually orthogonal gradient receivers are attached to the hybrid aircraft.

16. The system of claim 15, wherein the hybrid aircraft further comprises:
    a propulsion element and at least one buoyancy element, wherein the at least one buoyancy element contains a lighter than air gas.

17. The system of claim 15, further comprising:
    the three mutually orthogonal transmitters configured to transmit at a same pulse repetition frequency when firing each of the three mutually orthogonal transmitters sequentially.

18. The system of claim 15, further comprising:
    the three mutually orthogonal transmitters configured to transmit at a different pulse repetition frequency when firing each of the three mutually orthogonal transmitters non-sequentially.

19. The system of claim 15, wherein a power level for each axis of the three axis geophysical transmitter array is controllable for steering or sweeping of a primary magnetic field.

* * * * *